(12) United States Patent
Luo et al.

(10) Patent No.: US 11,727,673 B1
(45) Date of Patent: Aug. 15, 2023

(54) VISUAL ANALYSIS METHOD FOR CABLE ELEMENT IDENTIFICATION

(71) Applicant: SOOCHOW UNIVERSITY, Suzhou (CN)

(72) Inventors: Xizhao Luo, Suzhou (CN); Tingchen Wang, Suzhou (CN); Xiaoxiao Wang, Yihuai (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/018,857

(22) PCT Filed: Aug. 31, 2022

(86) PCT No.: PCT/CN2022/116051
§ 371 (c)(1),
(2) Date: Jan. 30, 2023

(30) Foreign Application Priority Data

Jun. 9, 2022 (CN) .......................... 202210649558.7

(51) Int. Cl.
*G06T 7/00* (2017.01)
*G06V 10/774* (2022.01)
(Continued)

(52) U.S. Cl.
CPC .......... *G06V 10/774* (2022.01); *G06T 7/0004* (2013.01); *G06V 10/764* (2022.01);
(Continued)

(58) Field of Classification Search
CPC .. G06V 10/774; G06V 10/764; G06V 10/776; G06V 20/70; G06T 7/0004;
(Continued)

(56) References Cited

U.S. PATENT DOCUMENTS

2009/0169089 A1* 7/2009 Hunt .................. G06F 18/24323
382/133
2018/0339720 A1* 11/2018 Singh ..................... G06T 7/001
(Continued)

FOREIGN PATENT DOCUMENTS

| CN | 109492698 A | 3/2019 |
| CN | 109657694 A | 4/2019 |

(Continued)

*Primary Examiner* — Ping Y Hsieh
(74) *Attorney, Agent, or Firm* — SZDC Law P.C.

(57) ABSTRACT

A visual analysis method for cable element identification includes steps of constructing and labeling a picture data set, preparing a training data set and training a model, to train the preset identification and analysis model, such that the preset identification and analysis model can have accuracy of identification of cable elements; then, cable element information existing in a target image screen is identified by the completely trained preset identification and analysis model, so as to label a target picture; in the analysis method, the produced and manufactured cable elements can be shot, and then, shot pictures are identified and analyzed by using the preset identification and analysis model, such that a structural quality condition of each cable element is rapidly and comprehensively determined, possible structural defects of each cable element can be conveniently and accurately known, and the cable elements with unqualified quality can be screened out in time.

10 Claims, 1 Drawing Sheet

(51) Int. Cl.
*G06V 20/70* (2022.01)
*G06V 10/776* (2022.01)
*G06V 10/764* (2022.01)

(52) U.S. Cl.
CPC ............ *G06V 10/776* (2022.01); *G06V 20/70* (2022.01); *G06T 2207/10024* (2013.01); *G06T 2207/20081* (2013.01); *G06T 2207/30108* (2013.01)

(58) Field of Classification Search
CPC . G06T 2207/10024; G06T 2207/20081; G06T 2207/30108
See application file for complete search history.

(56) References Cited

U.S. PATENT DOCUMENTS

| | | | |
|---|---|---|---|
| 2020/0134804 A1 | 4/2020 | Song et al. | |
| 2022/0036525 A1* | 2/2022 | Xin | G06V 10/772 |
| 2023/0153987 A1* | 5/2023 | Perkins | G06T 7/64 |
| | | | 382/152 |

FOREIGN PATENT DOCUMENTS

| | | | |
|---|---|---|---|
| CN | 111784673 A | 10/2020 | |
| CN | 113393414 A | 9/2021 | |
| CN | 114461986 A | 5/2022 | |
| CN | 114943875 A | 8/2022 | |

\* cited by examiner

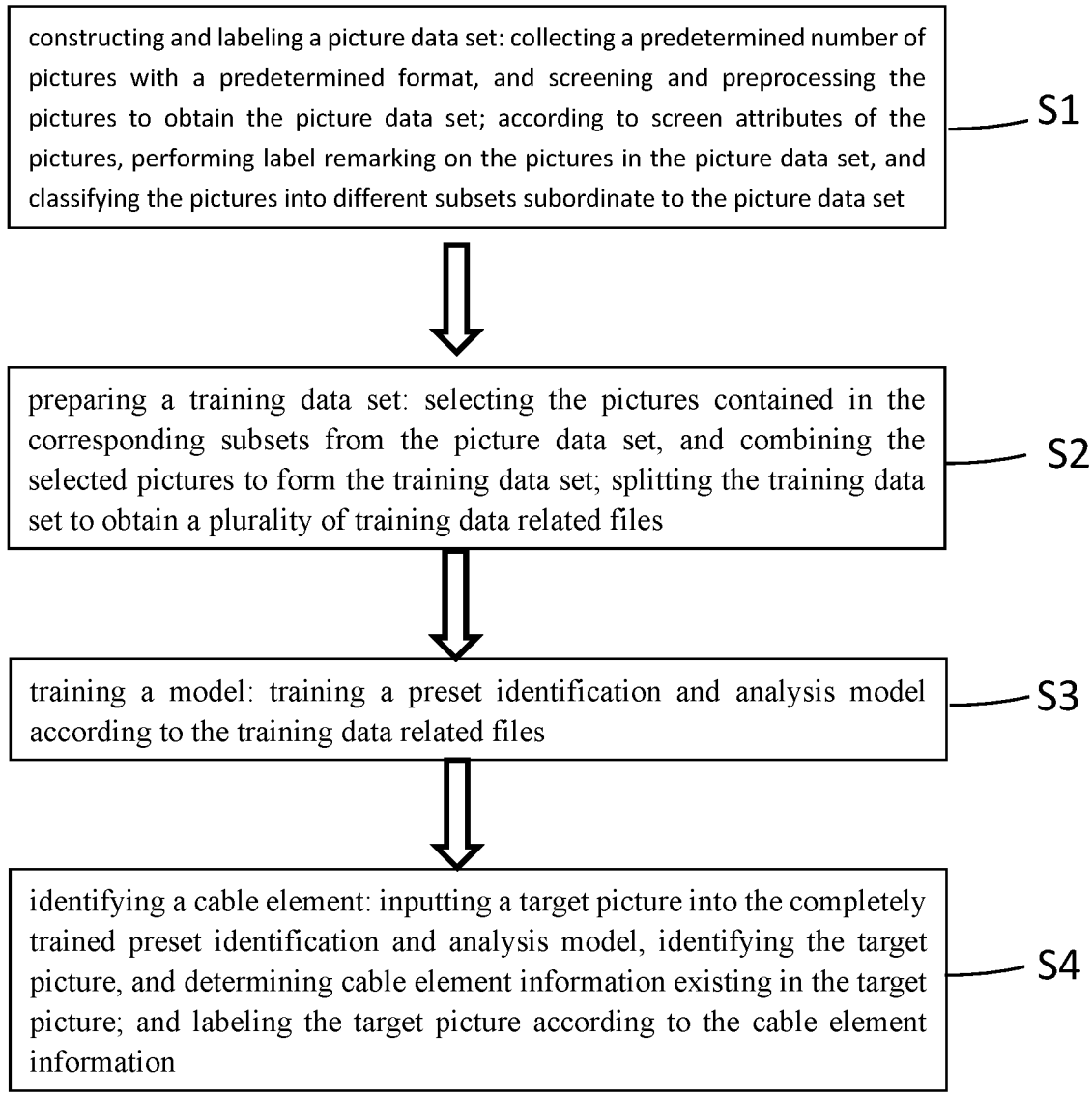

VISUAL ANALYSIS METHOD FOR CABLE ELEMENT IDENTIFICATION

This application is the National Stage Application of PCT/CN2022/116051, filed on Aug. 31, 2022, which claims priority to Chinese Patent Application No. 202210649558.7, filed on Jun. 9, 2022, which is incorporated by reference for all purposes as if fully set forth herein.

FIELD OF THE DISCLOSURE

The present invention relates to the field of visual identification, and particularly to a visual analysis method for cable element identification.

BACKGROUND OF THE DISCLOSURE

Cable elements have various types, and different cable elements inevitably have certain structural defects caused by influences of process factors in a production and manufacturing process, thereby influencing a working performance of the cable elements. Currently, the cable elements are subjected to sampling inspection and identification by means of manual inspection, but one-by-one careful identification and analysis cannot be performed on all the cable elements in manual inspection, and manual inspection not only consumes more manpower and time to realize quality inspection of the cable elements, but also cannot guarantee correctness of the quality inspection, such that some cable elements with unqualified quality flow into the market.

SUMMARY OF THE DISCLOSURE

A visual analysis method for cable element identification, comprising:

step S1: constructing and labeling a picture data set: collecting a predetermined number of pictures with a predetermined format, and screening and preprocessing the pictures to obtain the picture data set; according to screen attributes of the pictures, performing label remarking on the pictures in the picture data set, and classifying the pictures into different subsets subordinate to the picture data set;

step S2: preparing a training data set: selecting the pictures contained in the corresponding subsets from the picture data set, and combining the selected pictures to form the training data set; splitting the training data set to obtain a plurality of training data related files;

step S3: training a model: training a preset identification and analysis model according to the training data related files; and step S4: identifying a cable element: inputting a target picture into the completely trained preset identification and analysis model, identifying the target picture, and determining cable element information existing in the target picture; and labeling the target picture according to the cable element information.

The visual analysis method for cable element identification according to the present application includes the steps of constructing and labeling a picture data set, preparing a training data set and training a model, so as to train the preset identification and analysis model, such that the preset identification and analysis model can have accuracy of identification of the cable elements; then, the cable element information existing in a target image screen is identified by the completely trained preset identification and analysis model, so as to label the target picture; in the analysis method, the produced and manufactured cable elements can be shot, and then, the shot pictures are identified and analyzed by using the preset identification and analysis model, such that a structural quality condition of each cable element is rapidly and comprehensively determined, the possible structural defects of each cable element can be conveniently and accurately known, and the cable elements with unqualified quality can be screened out in time.

BRIEF DESCRIPTION OF DRAWINGS

FIG. 1 is a schematic flow diagram of a visual analysis method for cable element identification according to the present application.

DETAILED DESCRIPTION OF PREFERRED EMBODIMENTS

In order to make the aforementioned objects, features and advantages of the present application more apparent, embodiments of the present application are described in detail below with reference to the accompanying drawings.

Referring to FIG. 1, a visual analysis method for cable element identification according to an embodiment of the present application includes the following steps:

step S1: constructing and labeling a picture data set: collecting a predetermined number of pictures with a predetermined format, and screening and preprocessing the pictures to obtain the picture data set; according to screen attributes of the pictures, performing label remarking on the pictures in the picture data set, and classifying the pictures into different subsets subordinate to the picture data set;

step S2: preparing a training data set: selecting the pictures contained in the corresponding subsets from the picture data set, and combining the selected pictures to form the training data set; splitting the training data set to obtain a plurality of training data related files;

step S3: training a model: training a preset identification and analysis model according to the training data related files; and step S4: identifying a cable element: inputting a target picture into the completely trained preset identification and analysis model, identifying the target picture, and determining cable element information existing in the target picture; and labeling the target picture according to the cable element information.

The above visual analysis method includes the steps of constructing and labeling a picture data set, preparing a training data set and training a model, so as to train the preset identification and analysis model, such that the preset identification and analysis model can have accuracy of identification of the cable elements; then, the cable element information existing in a target image screen is identified by the completely trained preset identification and analysis model, so as to label the target picture; in the analysis method, the produced and manufactured cable elements can be shot, and then, shot pictures are identified and analyzed by using the preset identification and analysis model, such that a structural quality condition of each cable element is rapidly and comprehensively determined, possible structural defects of each cable element can be conveniently and accurately known, and the cable elements with unqualified quality can be screened out in time.

Optionally, in step S1, the collecting a predetermined number of pictures with a predetermined format, and screening and preprocessing the pictures to obtain the picture data set specifically includes:

collecting not less than 100 pictures with a predetermined format, the pictures having a jpg or bmp format;

acquiring an actual picture brightness value of each picture, and if the actual picture brightness value is within a preset brightness value range, reserving the corresponding picture; otherwise, removing the corresponding picture;

acquiring an actual picture resolution value of the reserved picture, and if the actual picture resolution value is less than a preset resolution threshold, performing pixel interpolation on the corresponding picture; and integrating all the reserved pictures to obtain the picture data set.

In this way, the collected pictures can be guaranteed to have an enough number and a matched format, which facilitates the preset identification and analysis model to directly identify and analyze the pictures subsequently; extra format conversion is not required to be performed on the pictures, and a preprocessing workload of the pictures is reduced. Furthermore, the picture with a lower actual picture brightness value is removed, thus effectively avoiding that the preset identification and analysis model cannot perform accurate identification due to insufficient brightness of the picture; pixel interpolation is performed on the picture with a smaller actual picture resolution value, thus effectively increasing a resolution of the picture, and guaranteeing identifiability of screen content of the picture.

Optionally, in step S1, the according to screen attributes of the pictures, performing label remarking on the pictures in the picture data set, and classifying the pictures into different subsets subordinate to the picture data set specifically includes:

acquiring screen chrominance information and screen line profile information of each picture in the picture data set;

according to the screen chrominance information and the screen line profile information, performing label remarking of a chrominance attribute and a line profile attribute on each picture of the picture data set; and classifying the pictures into different subsets subordinate to the picture data set according to the label remarking results.

In this way, the screen chrominance information and the screen line profile information of the picture are used as the screen attributes of the picture, such that the screen attributes of the picture can be identified in color and profile aspects; the screen chrominance information refers to a chrominance value of a picture screen, and the picture line profile information refers to a thickness and bending degree of a line profile in the picture screen. Then, label remarking about the chrominance attribute and the line profile attribute is performed on each picture according to the screen chrominance information and the screen line profile information, such that the pictures are subjected to refined distinction from the two aspects of color and profile.

Optionally, in step S2, the selecting the pictures contained in the corresponding subsets from the picture data set, and combining the selected pictures to form the training data set specifically includes:

randomly selecting a corresponding number of pictures from each subset according to a predetermined total picture selection number and a picture selection number proportion corresponding to each subset; and then randomly arranging and combining all the selected pictures to form the training data set.

In this way, the corresponding number of pictures are randomly selected from each subset according to the predetermined total picture selection number and the picture selection number ratio corresponding to each subset, such that the training data set can be ensured to contain pictures with different screen chrominance information and screen line profile information, thereby achieving comprehensiveness and reliability of subsequent training, verification and testing of the preset identification and analysis model.

Optionally, in step S2, the splitting the training data set to obtain a plurality of training data related files specifically includes:

randomly extracting different pictures from the training data set according to a preset training set picture number percentage value, a preset verification set picture number percentage value and a preset test set picture number percentage value, such that the extracted pictures are stored in a training set, a verification set and a test set; and then using the training set, the verification set and the test set as a training set data related file, a verification set data related file and a test set data related file respectively.

In this way, picture types contained in the training set, the verification set and the test set can be enriched to the maximum extent, such that the preset identification and analysis model can adapt to identification of different types of pictures, and identification accuracy of the preset identification and analysis model is correspondingly improved. The preset identification and analysis model may be, but is not limited to, a tensorflow model which is one of DNN models.

Optionally, in step S3, the training a preset identification and analysis model according to the training data related files specifically includes:

step S301: inputting the pictures contained in the training set data related file into the preset identification and analysis model, so as to train the preset identification and analysis model;

step S302: performing verification processing on the trained preset identification and analysis model using the pictures contained in the verification set data related file, so as to obtain a verification result of the pictures contained in the verification set data related file by the preset identification and analysis model; and step S303: performing test processing on the trained preset identification and analysis model using the pictures contained in the test set data related file; and judging whether the preset identification and analysis model is perfectly trained according to the test processing result.

In this way, the preset identification and analysis model is trained, verified and tested using the training set data related file, the verification set data related file and the test set data related file, thereby guaranteeing reliability and precision of identification of the pictures by the preset identification and analysis model.

Optionally, in step S302, the performing verification processing on the trained preset identification and analysis model, so as to obtain a verification result of the pictures contained in the verification set data related file by the preset identification and analysis model specifically includes:

performing verification processing on the trained preset identification and analysis model to obtain whether verification of each picture contained in the verification set data related file by the preset identification and analysis model is matched; and if verification of pictures with a number exceeding a first preset number threshold in the verification set data related file by the preset identification and analysis model is matched, proceeding to the next step S303; otherwise, returning to step S301, and continuously training the preset identification and analysis model.

Optionally, in step S303, the performing test processing on the trained preset identification and analysis model using the pictures contained in the test set data related file; and judging whether the preset identification and analysis model is perfectly trained according to the test processing result specifically includes:

performing test processing on the trained preset identification and analysis model using the pictures contained in the test set data related file to obtain a picture screen content test result of each picture by the preset identification and analysis model; and determining a number of pictures which are tested correctly in the test set data related file by the preset identification and analysis model according to the picture screen content test result; if the number of the pictures exceeds a second preset number threshold, determining that the preset identification and analysis model is perfectly trained; otherwise, determining that the preset identification and analysis model is not trained perfectly, and returning to steps S301 and S302.

In this way, the preset identification and analysis model can be trained, verified and tested in a closed-loop mode, the preset identification and analysis model is ensured to achieve corresponding learning convergence, and the picture identification precision of the preset identification and analysis model is improved.

Optionally, in step S4, the inputting a target picture into the completely trained preset identification and analysis model, identifying the target picture, and determining cable element information existing in the target picture specifically includes:

inputting the target picture into the completely trained preset identification and analysis model, and identifying the type of the cable element, a structural defect of the cable element and a position thereof in the screen of the target picture.

In this way, the produced and manufactured cable elements are shot to obtain the corresponding target pictures, the target pictures are then input into the completely trained preset identification and analysis model, the preset identification and analysis model can accurately determine the types of the cable elements, the structural defects of the cable elements and the positions thereof in the screens of the target pictures, and the target pictures are identified rapidly in batches.

Optionally, in step S4, the labeling the target picture according to the cable element information specifically includes:

labeling related text information of the corresponding cable element type, structural defect type and position thereof near each cable element existing in the screen of the target picture.

In this way, the related text information of the corresponding cable element type, structural defect type and position thereof are labeled near each cable element existing in the screen of the target picture, such that a user can intuitively obtain the structural defect condition of the cable element from the target picture, and thus accurately screen and distinguish the cable element.

The above is only one embodiment of the present invention, and any other improvements made based on the concept of the present invention are considered to be within the scope of the present invention.

REFERENCE NUMERALS

FIG. 1

S1: constructing and labeling a picture data set: collecting a predetermined number of pictures with a predetermined format, and screening and preprocessing the pictures to obtain the picture data set; according to screen attributes of the pictures, performing label remarking on the pictures in the picture data set, and classifying the pictures into different subsets subordinate to the picture data set S2: preparing a training data set: selecting the pictures contained in the corresponding subsets from the picture data set, and combining the selected pictures to form the training data set; splitting the training data set to obtain a plurality of training data related files S3: training a model: training a preset identification and analysis model according to the training data related files S4: identifying a cable element: inputting a target picture into the completely trained preset identification and analysis model, identifying the target picture, and determining cable element information existing in the target picture; and labeling the target picture according to the cable element information

What is claimed is:

1. A visual analysis method for cable element identification, comprising:
   step S1: constructing and labeling a picture data set: collecting a predetermined number of pictures with a predetermined format, and screening and preprocessing the pictures to obtain the picture data set; according to screen attributes of the pictures, performing label remarking on the pictures in the picture data set, and classifying the pictures into different subsets subordinate to the picture data set;
   step S2: preparing a training data set: selecting the pictures contained in the corresponding subsets from the picture data set, and combining the selected pictures to form the training data set; splitting the training data set to obtain a plurality of training data related files;
   step S3: training a model: training a preset identification and analysis model according to the training data related files; and
   step S4: identifying a cable element: inputting a target picture into the completely trained preset identification and analysis model, identifying the target picture, and determining cable element information existing in the target picture; and labeling the target picture according to the cable element information.

2. The visual analysis method for cable element identification according to claim 1,
   wherein in step S1, the collecting a predetermined number of pictures with a predetermined format, and screening and preprocessing the pictures to obtain the picture data set specifically comprises:
   collecting not less than 100 pictures with a predetermined format, the pictures having a jpg or bmp format;
   acquiring an actual picture brightness value of each picture, and if the actual picture brightness value is within a preset brightness value range, reserving the corresponding picture; otherwise, removing the corresponding picture;
   acquiring an actual picture resolution value of the reserved picture, and if the actual picture resolution value is less than a preset resolution threshold, performing pixel interpolation on the corresponding picture; and integrating all the reserved pictures to obtain the picture data set.

3. The visual analysis method for cable element identification according to claim 2,
wherein in step S1, the according to screen attributes of the pictures, performing label remarking on the pictures in the picture data set, and classifying the pictures into different subsets subordinate to the picture data set specifically comprises:
acquiring screen chrominance information and screen line profile information of each picture in the picture data set;
according to the screen chrominance information and the screen line profile information, performing label remarking of a chrominance attribute and a line profile attribute on each picture of the picture data set; and
classifying the pictures into different subsets subordinate to the picture data set according to the label remarking results.

4. The visual analysis method for cable element identification according to claim 1,
wherein in step S2, the selecting the pictures contained in the corresponding subsets from the picture data set, and combining the selected pictures to form the training data set specifically comprises:
randomly selecting a corresponding number of pictures from each subset according to a predetermined total picture selection number and a picture selection number proportion corresponding to each subset; and
then randomly arranging and combining all the selected pictures to form the training data set.

5. The visual analysis method for cable element identification according to claim 4,
wherein in step S2, the splitting the training data set to obtain a plurality of training data related files specifically comprises:
randomly extracting different pictures from the training data set according to a preset training set picture number percentage value, a preset verification set picture number percentage value and a preset test set picture number percentage value, such that the extracted pictures are stored in a training set, a verification set and a test set; and
then using the training set, the verification set and the test set as a training set data related file, a verification set data related file and a test set data related file respectively.

6. The visual analysis method for cable element identification according to claim 5,
wherein in step S3, the training a preset identification and analysis model according to the training data related files specifically comprises:
step S301: inputting the pictures contained in the training set data related file into the preset identification and analysis model, so as to train the preset identification and analysis model;
step S302: performing verification processing on the trained preset identification and analysis model using the pictures contained in the verification set data related file, so as to obtain a verification result of the pictures contained in the verification set data related file by the preset identification and analysis model; and
step S303: performing test processing on the trained preset identification and analysis model using the pictures contained in the test set data related file; and
judging whether the preset identification and analysis model is perfectly trained according to the test processing result.

7. The visual analysis method for cable element identification according to claim 6,
wherein in step S302, the performing verification processing on the trained preset identification and analysis model, so as to obtain a verification result of the pictures contained in the verification set data related file by the preset identification and analysis model specifically comprises:
performing verification processing on the trained preset identification and analysis model to obtain whether verification of each picture contained in the verification set data related file by the preset identification and analysis model is matched; and
if verification of pictures with a number exceeding a first preset number threshold in the verification set data related file by the preset identification and analysis model is matched, proceeding to the next step S303; otherwise, returning to step S301, and continuously training the preset identification and analysis model.

8. The visual analysis method for cable element identification according to claim 7,
wherein in step S303, the performing test processing on the trained preset identification and analysis model using the pictures contained in the test set data related file; and judging whether the preset identification and analysis model is perfectly trained according to the test processing result specifically comprises:
performing test processing on the trained preset identification and analysis model using the pictures contained in the test set data related file to obtain a picture screen content test result of each picture by the preset identification and analysis model; and
determining a number of pictures which are tested correctly in the test set data related file by the preset identification and analysis model according to the picture screen content test result; if the number of the pictures exceeds a second preset number threshold, determining that the preset identification and analysis model is perfectly trained; otherwise, determining that the preset identification and analysis model is not trained perfectly, and returning to steps S301 and S302.

9. The visual analysis method for cable element identification according to claim 8,
wherein in step S4, the inputting a target picture into the completely trained preset identification and analysis model, identifying the target picture, and determining cable element information existing in the target picture specifically comprises:
inputting the target picture into the completely trained preset identification and analysis model, and identifying the type of the cable element, a structural defect of the cable element and a position thereof in the screen of the target picture.

10. The visual analysis method for cable element identification according to claim 9,
wherein in step S4, the labeling the target picture according to the cable element information specifically comprises:
labeling related text information of the corresponding cable element type, structural defect type and position thereof near each cable element existing in the screen of the target picture.

* * * * *